US009325209B2

(12) United States Patent
Kojima et al.

(10) Patent No.: US 9,325,209 B2
(45) Date of Patent: Apr. 26, 2016

(54) ROTATING ELECTRICAL MACHINE AND MANUFACTURING METHOD OF ROTOR

(71) Applicant: KABUSHIKI KAISHA YASKAWA DENKI, Kitakyushu-shi (JP)

(72) Inventors: Jun Kojima, Kitakyushu (JP); Kiyomi Inoue, Kitakyushu (JP); Kensuke Nakazono, Kitakyushu (JP); Yoshiaki Kamei, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 160 days.

(21) Appl. No.: 14/062,892

(22) Filed: Oct. 25, 2013

(65) Prior Publication Data

US 2014/0306569 A1    Oct. 16, 2014

(30) Foreign Application Priority Data

Apr. 15, 2013    (JP) .................................. 2013-085005

(51) Int. Cl.
*H02K 1/27*    (2006.01)
*H02K 1/28*    (2006.01)
*H02K 15/03*    (2006.01)

(52) U.S. Cl.
CPC ................ *H02K 1/28* (2013.01); *H02K 1/2773* (2013.01); *H02K 15/03* (2013.01); *Y10T 29/49012* (2015.01)

(58) Field of Classification Search
None
See application file for complete search history.

(56) References Cited

U.S. PATENT DOCUMENTS

| | | | | |
|---|---|---|---|---|
| 5,159,220 A * | 10/1992 | Kliman | ................ | H02K 1/2766 310/156.56 |
| 6,353,275 B1 * | 3/2002 | Nishiyama et al. | ...... | 310/156.53 |
| 7,122,930 B2 * | 10/2006 | Yamagishi | ............. | H02K 1/276 310/156.49 |
| 7,151,335 B2 * | 12/2006 | Tajima | ................. | H02K 1/2766 310/156.48 |
| 7,170,209 B2 * | 1/2007 | Araki | ................... | H02K 1/2766 29/598 |
| 7,262,526 B2 * | 8/2007 | Shiga et al. | ...................... | 310/43 |
| 7,521,832 B2 * | 4/2009 | Tajima | ................. | H02K 1/2766 310/156.48 |
| 7,612,480 B2 * | 11/2009 | Fujii | .................... | H02K 1/2766 310/156.53 |

(Continued)

FOREIGN PATENT DOCUMENTS

| | | |
|---|---|---|
| CN | 102629790 | 8/2012 |
| CN | 102812619 | 12/2012 |

(Continued)

OTHER PUBLICATIONS

Extended European Search Report for corresponding EP Application No. 13188860.4-1809, Sep. 4, 2014.

(Continued)

*Primary Examiner* — Tran Nguyen
(74) *Attorney, Agent, or Firm* — Mori & Ward, LLP (57) ABSTRACT

A rotating electrical machine comprises a stator and a rotor. The rotor includes a rotor iron core in which a permanent magnet is disposed. The rotor iron core comprises a connection part, a plurality of magnetic pole part, a first gap, and a second gap for injection of the adhesive. The connection part is configured to surround a rotational axis. The plurality of magnetic pole parts are provided in an outer portion than the connection part in a radial direction. The first gap is configured to penetrate along an axial direction between the magnetic pole parts in an outer portion than the connection part in the radial direction and in which the permanent magnet is fixed with adhesive. At least one of the second gaps is provided for each of the first gaps in communication with the first gap.

5 Claims, 7 Drawing Sheets

(56) References Cited

U.S. PATENT DOCUMENTS

| | | | |
|---|---|---|---|
| 7,622,841 B2* | 11/2009 | Yoshikawa et al. | 310/156.53 |
| 8,860,276 B2 | 10/2014 | Takizawa | |
| 8,957,561 B2 | 2/2015 | Sano et al. | |
| 2007/0252469 A1* | 11/2007 | Nishiura | H02K 1/2773 310/156.56 |
| 2009/0026867 A1* | 1/2009 | Haruno et al. | 310/156.21 |
| 2009/0045688 A1* | 2/2009 | Liang | H02K 1/2766 310/156.07 |
| 2010/0308678 A1* | 12/2010 | Liang | H02K 1/2766 310/156.38 |
| 2012/0038236 A1* | 2/2012 | Tajima | H02K 1/2766 310/156.43 |
| 2012/0038237 A1* | 2/2012 | Li | H02K 1/146 310/156.45 |
| 2012/0200188 A1 | 8/2012 | Sano et al. | |
| 2012/0206007 A1* | 8/2012 | Kitagawa | H02K 1/2766 310/156.08 |
| 2012/0326548 A1* | 12/2012 | Nonaka | 310/156.19 |
| 2013/0020897 A1 | 1/2013 | Takizawa | |
| 2013/0057103 A1 | 3/2013 | Han et al. | |

FOREIGN PATENT DOCUMENTS

| | | |
|---|---|---|
| DE | 10 2009 054 584 | 6/2011 |
| EP | 1420499 | 5/2004 |
| EP | 1921734 | 5/2008 |
| JP | 63-140644 | 6/1988 |
| JP | 06245419 A * | 9/1994 |
| JP | 11-191939 | 7/1999 |
| JP | 2006-109683 | 4/2006 |
| JP | 2006-345600 | 12/2006 |
| JP | 2010-226785 | 10/2010 |
| JP | 2012-165482 | 8/2012 |
| JP | 2012-231578 | 11/2012 |
| KR | 10-1244574 B1 | 3/2013 |
| WO | WO 2011/114594 | 9/2011 |
| WO | WO 2011/122328 | 10/2011 |

OTHER PUBLICATIONS

Japanese Office Action for corresponding JP Application No. 2013-085005, Mar. 3, 2015.

Korean Office Action for corresponding KR Application No. 10-2013-0124179, Feb. 23, 2015.

Japanese Office Action for corresponding JP Application No. 2013-085005, Oct. 19, 2015.

Chinese Office Action for corresponding CN Application No. 201310487465.X, Jan. 6, 2016.

* cited by examiner

ROTATING ELECTRICAL MACHINE AND MANUFACTURING METHOD OF ROTOR

CROSS-REFERENCE TO RELATED APPLICATION

The present application claims priority from Japanese Patent Application No. 2013-85005, which was filed on Apr. 15, 2013, the disclosure of which is incorporated herein by reference in its entirety.

BACKGROUND OF THE INVENTION

1. Field of the Invention

An embodiment to be disclosed relates to a rotating electrical machine and a manufacturing method of a rotor.

2. Description of the Related Art

There is known a rotor of a rotating electrical machine in which a permanent magnet is inserted and disposed in a gap provided radially between neighboring magnetic poles.

SUMMARY

According to one aspect of the disclosure, there is provided a rotating electrical machine comprises a stator and a rotor. The rotor includes a rotor iron core in which a permanent magnet is disposed. The rotor iron core comprises a connection part, a plurality of magnetic pole part, a first gap, and a second gap for injection of the adhesive. The connection part is configured to surround a rotational axis. The plurality of magnetic pole parts are provided in an outer portion than the connection part in a radial direction. The first gap is configured to penetrate along an axial direction between the magnetic pole parts in an outer portion than the connection part in the radial direction and in which the permanent magnet is fixed with adhesive. At least one of the second gaps is provided for each of the first gaps in communication with the first gap.

According to another aspect of the disclosure, there is provided a rotating electrical machine comprises a stator and a rotor. The rotor includes a rotor iron core in which a permanent magnet is disposed. The rotor iron core comprises a connection part, a plurality of magnetic pole part, a first gap, a second gap for injection of the adhesive, and a third gap for magnetic flux leakage prevention. The connection part is configured to surround a rotational axis. The plurality of magnetic pole parts are provided in an outer portion than the connection part in a radial direction. The first gap is configured to penetrate along an axial direction between the magnetic pole parts in an outer portion than the connection part in the radial direction and in which the permanent magnet is fixed with adhesive. At least one of the second gaps is provided for each of the first gaps in communication with the first gap. The third gap is provided between the first gaps at an inner portion than the magnetic pole part in the radial direction.

According to another aspect of the disclosure, there is provided a rotating electrical machine comprises a stator and a rotor. The rotor includes a rotor iron core in which a permanent magnet is disposed. The rotor iron core comprises a connection part, a plurality of magnetic pole parts, means for fixing the permanent magnet with adhesive, and means for injecting adhesive. The connection part is configured to surround a rotational axis. The plurality of magnetic pole parts are provided in an outer portion than the connection part in a radial direction. The means for fixing the permanent magnet with adhesive is arranged between the magnetic pole parts in an outer portion than the connection part in the radial direction. At least one of the means for injecting adhesive is provided for each of the means for fixing the permanent magnet with adhesive in communication with the means for fixing the permanent magnet with adhesive.

According to another aspect of the disclosure, there is provided a manufacturing method of a rotor including a rotor iron core. The iron core comprises a plurality of magnetic pole parts and a first gap provided between the magnetic pole parts. The manufacturing method comprises an inserting and a fixing. In the inserting, a permanent magnet is inserted into the first gap. In the fixing, the permanent magnet is fixed by injecting adhesive into the first gap via a second gap in communication with the first gap.

DESCRIPTION OF THE EMBODIMENTS

Hereinafter, an embodiment will be explained with reference to the drawings.

Configuration of a Rotating Electrical Machine

Figure 1:
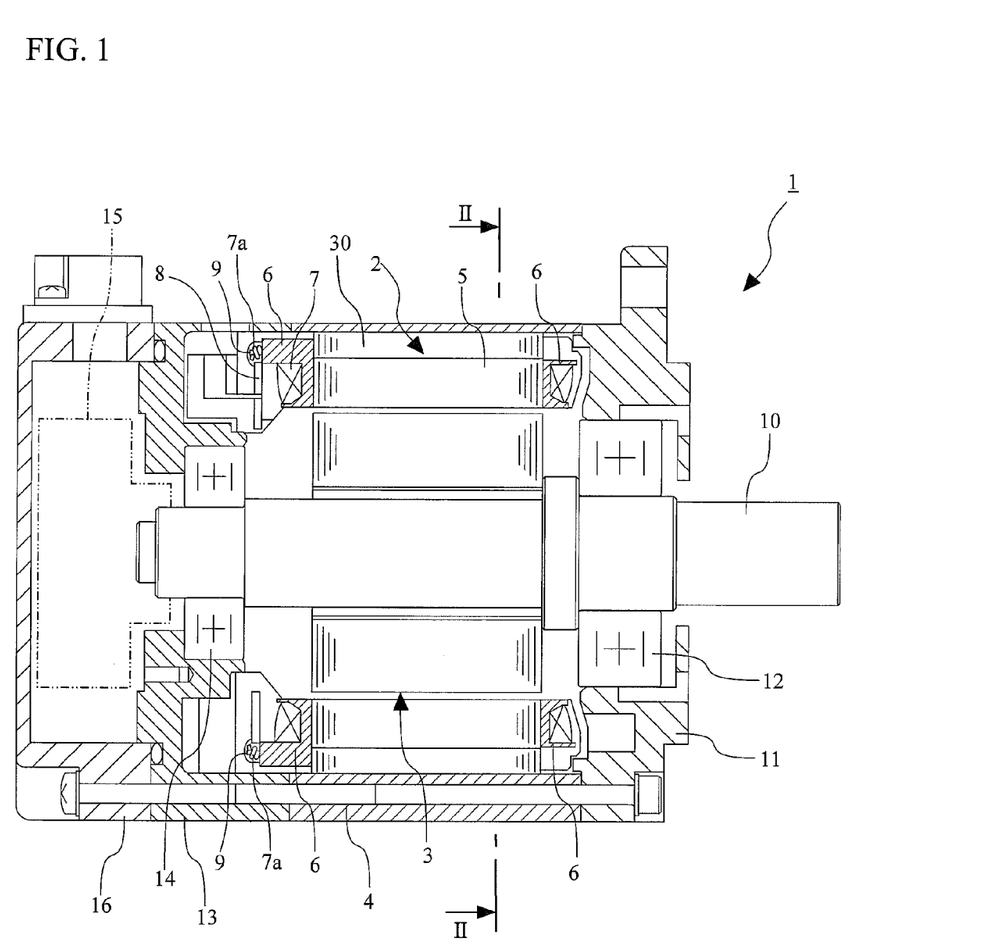
FIG. 1 is an axial cross-sectional view showing an entire schematic configuration of a rotating electrical machine in an embodiment.
Figure 2:
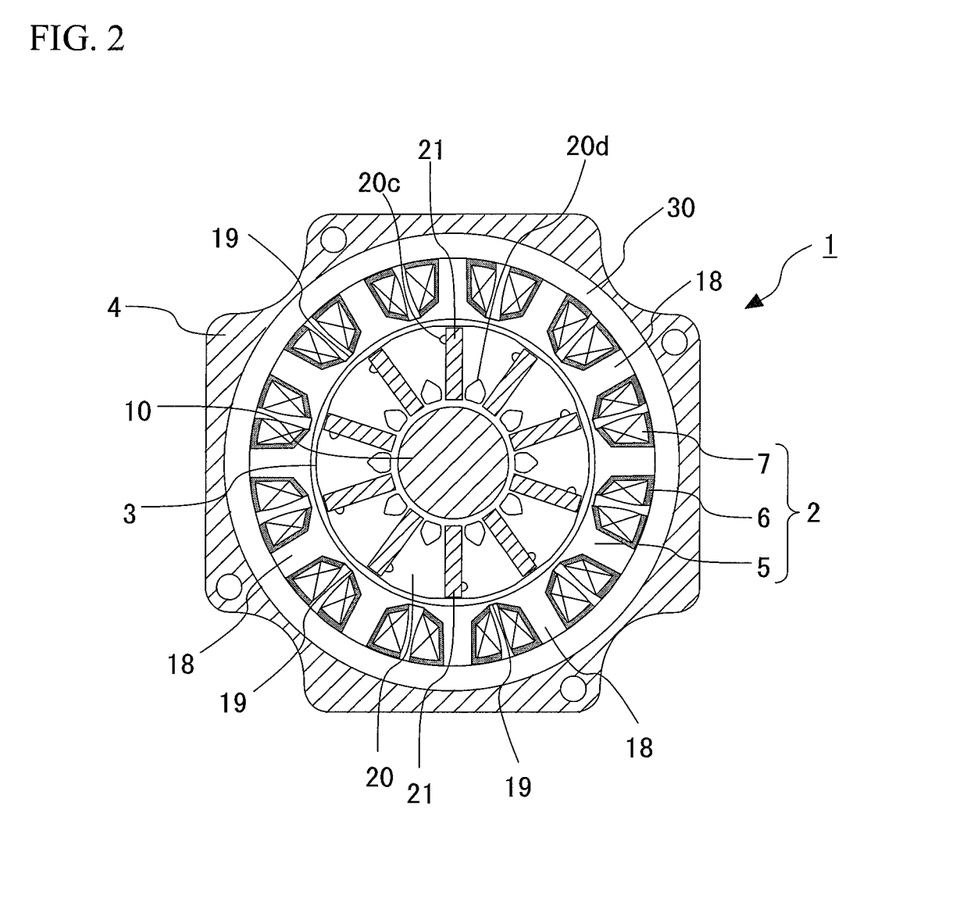
FIG. 2 is a transverse cross-sectional view along II-II cross section in FIG. 1.

First, by the use of FIG. 1 and FIG. 2, there will be explained a configuration of a rotating electrical machine 1 according to the present embodiment. As shown in FIG. 1 and FIG. 2, the rotating electrical machine 1 includes a stator 2 and a rotor 3, and is an inner-rotor type motor including the rotor 3 inside the stator 2. The stator 2 is provided for the inner circumferential face of a frame 4 so as to face the rotor 3 in a radial direction. Between the stator 2 and the frame 4, there is disposed a laminated core ring 30 having a ring shape. This stator 2 includes a stator iron core 5, a bobbin 6 mounted on the stator iron core 5, and a coil wire 7 wound around the bobbin 6. The bobbin 6 is configured with insulating material for electrically insulating the stator iron core 5 and the coil wire 7 from each other. A substrate 8 is provided on one side of the bobbin 6 in an axial (left side in FIG. 1). A circuit provided on this substrate 8 and the coil wire 7 wound around the bobbin 6 are connected electrically with each other via two pin terminals 9 each having a square bar shape. End parts 7a where winding of the coil wire 7 starts and ends are wound to the corresponding pin terminals 9 and fixed to the pin terminals 9 with solder or the like which is omitted from illustration.

The rotor 3 is provided for the outer circumferential face of a rotational axis 10. The rotational axis 10 is supported rotatably by a bearing 12 on a load-side and a bearing 14 on a side opposite to the load side. An outer ring of the bearing 12 on the load side is fitted together with a load-side bracket 11 provided on the load side of the frame 4 (right side in FIG. 1). An outer ring of the bearing 14 on the side opposite to the load-side is fitted together with a bracket 13 on the side opposite to the load side which is provided on the side opposite to the load-side of the frame 4 (opposite side of the load-side and left side in FIG. 1). An encoder 15 is provided at the end part of the rotational axis 10 on the side opposite to the load-side. The encoder 15 is covered by an encoder cover 16. Further, the rotor 3 includes a rotor iron core 20 and plural permanent magnets 21 which are provided in the rotor iron core 20 and disposed radially centering the rotational axis 10.

The stator iron core 5 includes plural (e.g., twelve in FIG. 2) protrusion parts 18 protruding radially outward in the radial direction. The bobbin 6 around which the coil wire 7 is wound is attached to each of the protrusion parts 18 from outside. As shown in FIG. 2, in a concave part 19 between the two neighboring protrusion parts 18, side parts of the winding layers in the coil wires 7 on the bobbins 6, which are attached to the respective protrusion parts 18, are disposed facing each other with a gap. The stator 2 is assembled by means of fixing the stator iron core 5 on the inner circumference of the laminated core ring 30 having the ring shape after the bobbin 6 around which the coil wire 7 is wound has been attached to the stator iron core 5. The assembled stator 2 is attached to the inner circumferential face of the frame 4. After that, resin is inserted into the concave part 19 with pressure, and the bobbin 6, the coil wire 7 and the like are molded with the resin.

Configuration of a Rotor Iron Core

Figure 3:
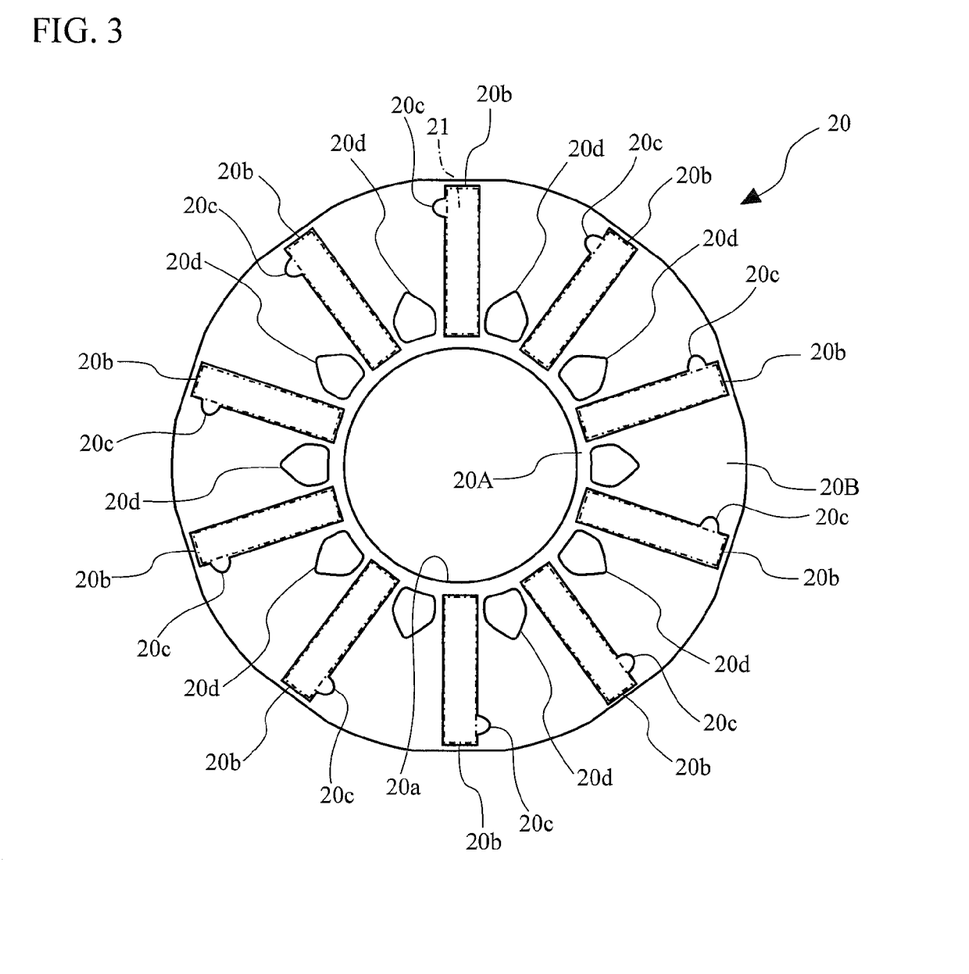
FIG. 3 is a side view of a rotor iron core in an embodiment.

The rotor iron core 20, as shown in FIG. 3, includes a connection part 20A surrounding the rotational axis 10, plural (ten in this example) magnetic pole parts 20B provided outside the connection part 20A in the radial direction, a permanent magnet insertion hole 20b, an adhesive injection groove 20c, and a magnetic flux leakage prevention hole 20d. A center hole 20a in which the rotational axis 10 penetrates is provided on the inner circumferential side of the connection parts 20A.

The permanent magnet insertion hole 20b is provided penetrating along the axial between the two neighboring magnetic pole parts 20B and 20B outside the connection part 20A in the radial direction. The permanent magnet 21 is axially inserted into the permanent magnet insertion hole 20b and fixed by adhesive. The permanent magnet insertion hole 20b is extended radially from the center of the center hole 20a. The permanent magnet insertion hole 20b has a size (cross-sectional area in a transverse cross section) approximately the same as the size (cross-sectional area in the transverse cross section) of the permanent magnet 21, but, in detail, has a size larger than the permanent magnet 21 by an amount corresponding to a small gap (corresponding to insertion margin). Here, the permanent magnet insertion hole 20b is an example of a first gap and also functions as means for fixing a permanent magnet with adhesive.

The adhesive injection groove 20c is provided for each of the permanent magnet insertion holes 20b and also is a gap for adhesive injection in communication with the permanent magnet insertion hole 20b. The adhesive injection groove 20c is provided axially penetrating the permanent magnet insertion hole 20b on one side in the circumferential direction. This adhesive injection groove 20c becomes a remaining space excluding a small gap between the rotor iron core 20 and the permanent magnet 21 when the permanent magnet 21 is inserted into the permanent magnet insertion hole 20b and the permanent magnet insertion hole 20b is filled. Accordingly, by injecting the adhesive into this adhesive injection groove 20c which becomes the remaining space, it is possible to fix the permanent magnet 21 to the rotor iron core 20. Here, the adhesive injection groove 20c is an example of a second gap and functions as means for injecting adhesive.

The magnetic flux leakage prevention hole 20d is a gap for preventing leakage magnetic flux which is provided between the two neighboring permanent magnet insertion holes 20b and 20b in a portion inside the magnetic pole part 20B in the radial direction. The magnetic flux leakage prevention hole 20d suppresses leakage of a magnetic flux from the permanent magnet 21 to the inside of the magnetic flux leakage prevention hole 20d in the radial direction, and thereby prevents reduction of a magnetic flux which contributes to generation of rotational torque. Here, the magnetic flux leakage prevention hole 20d is an example of a third gap.

Here, preferably the magnetic flux leakage prevention hole 20d has a transverse cross-sectional shape protruding outward in the radial direction. By such a shape, it is possible to guide the magnetic flux from each of the two permanent magnets 21 and 21 which are located on both sides of the magnetic flux leakage prevention hole 20d in the circumferential direction, smoothly to the outer circumferential side of the rotor iron core 20 along the shape protruding outward in the radial direction. In the present embodiment, by causing the magnetic flux leakage prevention hole 20d to have an approximately pentagonal shape, it is possible to obtain the above described effect. Further, together with this effect, it is possible to reduce a gap between the side face of the permanent magnet 21 where a magnetic flux is generated and the face of the magnetic flux leakage prevention hole 20d facing this side face, and to improve the reduction effect of the leakage flux to the inner circumferential side.

Manufacturing Method of a Rotor

In manufacturing of the rotor 3 having the above described configuration, first, the permanent magnet 21 is inserted into the permanent magnet insertion hole 20b of the rotor iron core 20 (corresponding to an inserting step). After that, the adhesive is injected into the permanent magnet insertion hole 20b in which the permanent magnet 21 is inserted, via the adhesive injection groove 20c in communication with the permanent magnet insertion hole 20b, and the permanent magnet 21 is fixed (corresponding to a fixing step).

Advantage of the Embodiment

As described above, in the rotating electrical machine 1 of the present embodiment, separately from the permanent magnet insertion hole 20b in which the permanent magnet 21 is fixed, the adhesive injection groove 20c in communication with this permanent magnet insertion hole 20b is provided in the rotor iron core 20. Then, the adhesive is injected into the permanent magnet insertion hole 20b via the adhesive injection groove 20c after the permanent magnet 21 has been inserted into the permanent magnet insertion hole 20b in a state without adhesive coating. Thereby, it is possible to bond a face of the permanent magnet 21 inserted in the permanent magnet insertion hole 20b on one side in the circumferential direction to the wall face of the permanent magnet insertion hole 20b facing this face, and to fix the permanent magnet 21 to the permanent magnet insertion hole 20b. As a result, it is possible to prevent protrusion of the adhesive as in a case of coating the adhesive on the permanent magnet 21 and inserting the permanent magnet 21 into the permanent magnet insertion hole 20b. Accordingly, since the adhesive does not protrude at the end face of the rotor iron core 20, it is not necessary to perform a step of wiping-off the protruded adhesive.

Note that, in the present embodiment, since the permanent magnet 21 is fixed with the adhesive injected in the adhesive injection groove 20c, only a part in the surface in the radial direction of the permanent magnet 21 on one side in the circumferential direction is bonded. However, the rotating electrical machine 1 is an embedded-magnet type (position of the permanent magnet 21 is not shifted in the radial direction), and it is sufficient to prevent position shift only in the axial of the permanent magnet 21. Accordingly, it is possible to fix the permanent magnet 21 firmly enough with the adhesive injected in the adhesive injection groove 20c.

Variation Example

Note that an embodiment to be disclosed is not limited to above described aspect, and can be modified variously in a range not departing from the gist and technical idea thereof. In the following, such variation examples will be explained sequentially.

Figure 4:
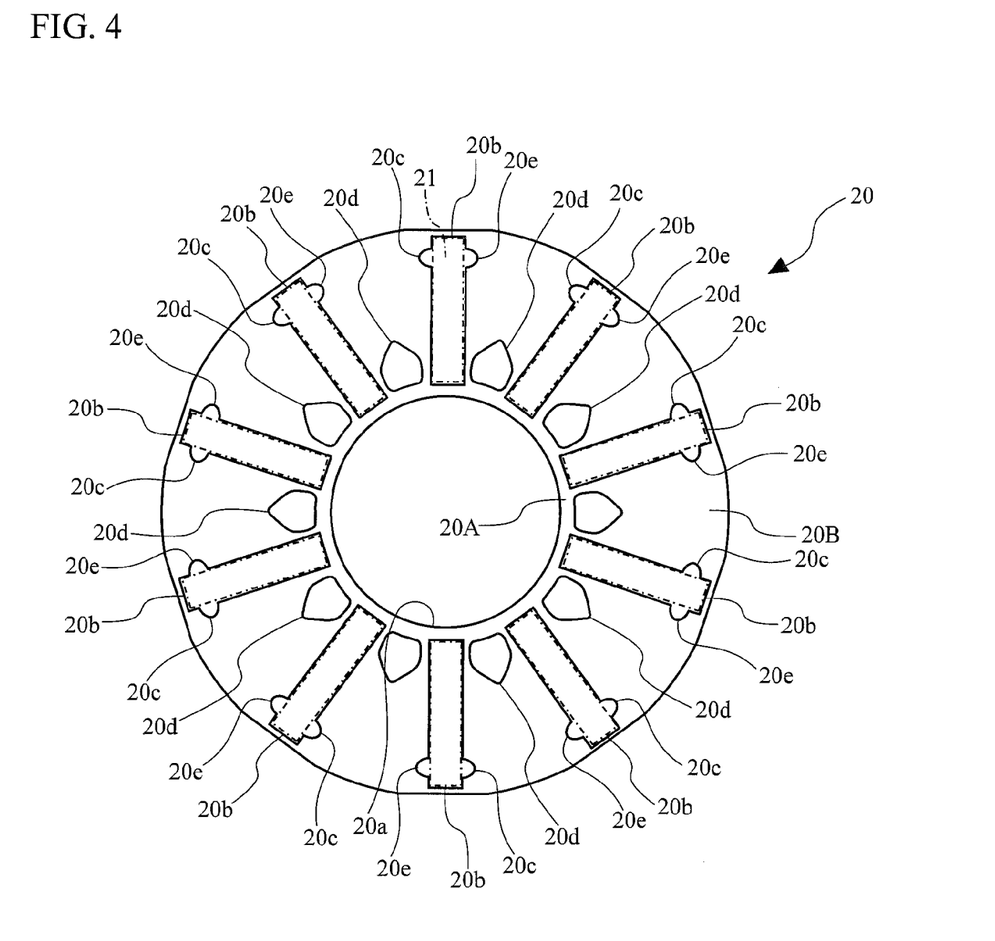
FIG. 4 is a side view showing an example of a rotor iron core in a variation example in which adhesive injection grooves are formed on both sides of a permanent magnet insertion hole in a circumferential direction.

(1) Case of Forming Adhesive Injection Grooves on Both Sides of the Permanent Magnet Insertion Hole 20b in the Circumferential Direction While, in the embodiment, the adhesive injection groove 20c is provided only on one side of the permanent magnet insertion hole 20b in the circumferential direction, the embodiment is not limited to this structure. For example, as shown in FIG. 4, adhesive injection grooves 20c and 20e (corresponding to an example of the second gap in the present variation example) may be provided for each of the permanent magnet insertion hole 20b on both sides in the circumferential direction. In this example, the adhesive injection groove 20c and the adhesive injection groove 20e are provided so as to face each other in the circumferential direction (so as to have the same position in the radial direction).

Figure 5:
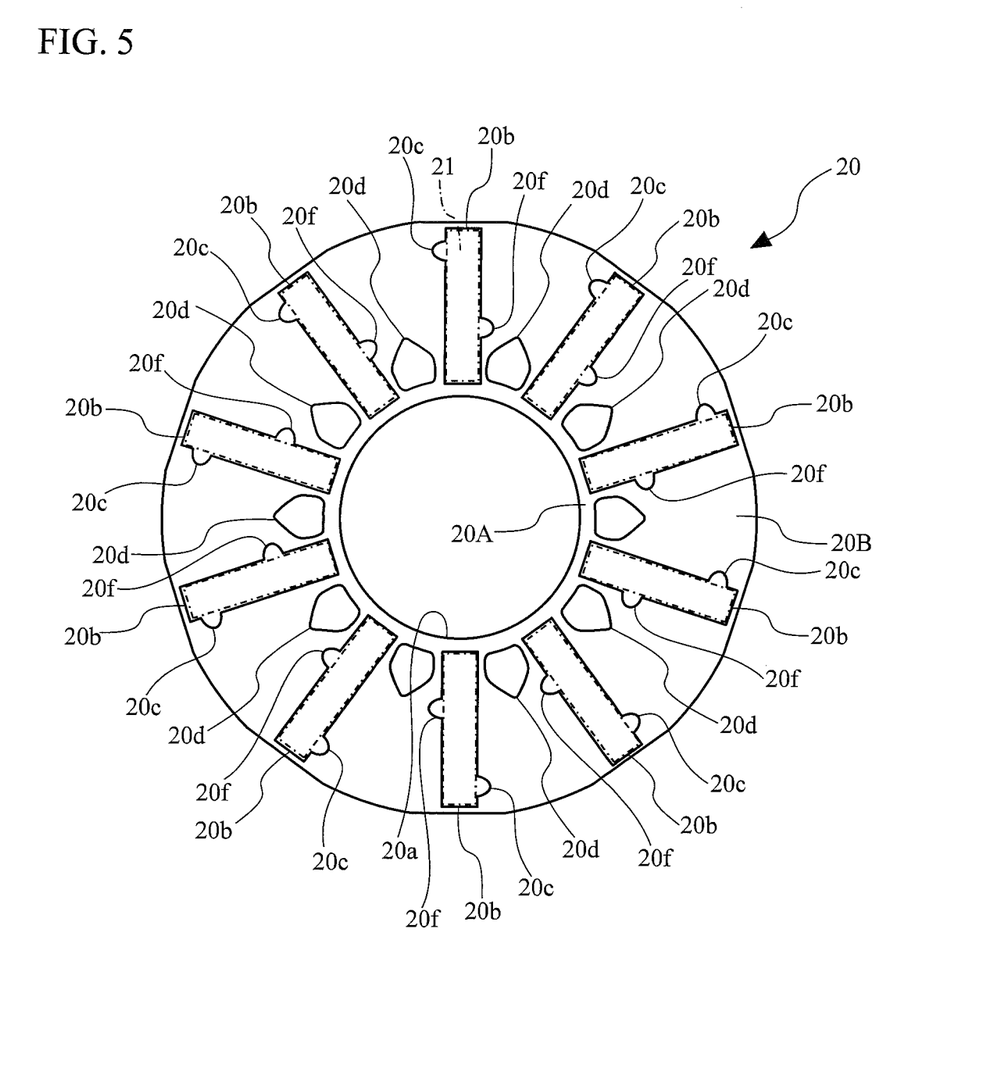
FIG. 5 is a side view showing another example of a rotor iron core in a variation example in which adhesive injection grooves are formed on both sides of a permanent magnet insertion hole in a circumferential direction.

Alternatively, as shown in FIG. 5, for example, each of two adhesive injection grooves 20c and 20f (corresponding to an example of the second gap in the present variation example) may be provided so as to have positions different from each other in the radial direction on both sides of the permanent magnet insertion hole 20b in the circumferential direction. In this example, the adhesive injection groove 20f is provided on a side facing the adhesive injection groove 20c in the circumferential direction and also provided closer to the center than the adhesive injection groove 20c.

According to the present variation example, the side faces of the permanent magnet 21 inserted in the permanent magnet insertion hole 20b on both sides in the circumferential direction are bonded to the respective corresponding wall faces of the permanent magnet insertion hole 20b. Thereby, it is possible to fix the permanent magnet 21 more firmly to the permanent magnet insertion hole 20b.

Figure 6:
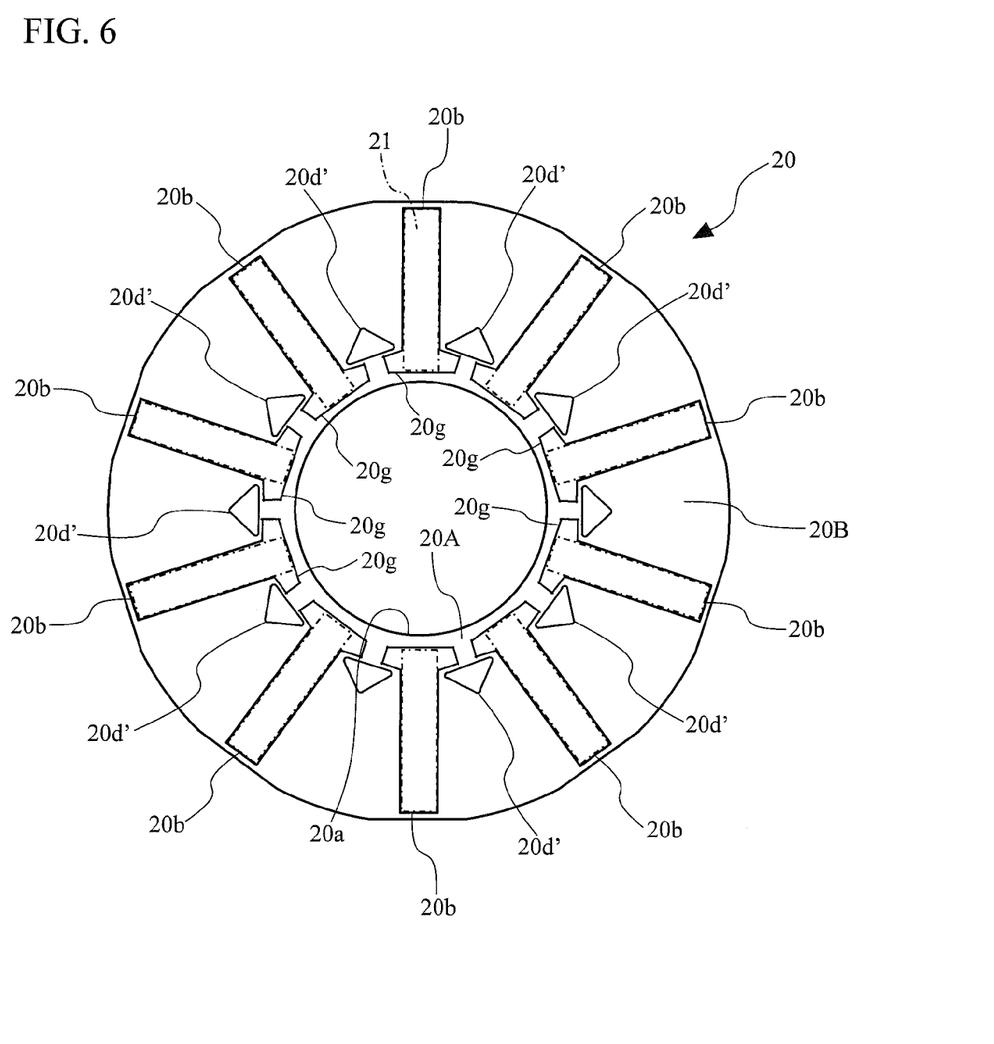
FIG. 6 is a side view showing an example of a rotor iron core in a variation example in which an adhesive injection groove is formed inside a magnetic flux leakage prevention hole in a radial direction.

(2) Case of Forming the Adhesive Injection Groove Inside the Magnetic Flux Leakage Prevention Hole in the Radial Direction In the embodiment, since the adhesive injection groove 20c is provided outside the magnetic flux leakage prevention hole 20d in the radial direction, there can be a case of reducing the flux from the permanent magnet 21 which contributes to the rotational torque generation. Accordingly, as shown in FIG. 6, an adhesive injection groove 20g (corresponding to an example of the second gap in the present variation example) may be provided inside the magnetic flux leakage prevention hole 20d' (corresponding to an example of the third gap of the present variation example) in the radial direction.

Each of the adhesive injection grooves 20g and 20g of the present variation example is provided so as to protrude on both sides in the circumferential direction at the end part of the permanent magnet insertion hole 20b on the inner circumferential side. Note that one adhesive injection groove 20g may be provided so as to protrude only on one side in the circumferential direction.

Further, a magnetic flux leakage prevention hole 20d' is provided outside the adhesive injection grooves 20g and 20g in the radial direction, which adhesive injection grooves 20g and 20g are provided protruding from the respective permanent magnet insertion holes 20b and 20b neighboring in the circumferential direction. As described above, preferably the magnetic flux leakage prevention hole 20d' has a transverse cross-sectional shape protruding outward in the radial direction and is formed to have an approximately triangular shape in the present variation example. A wall face located on the center side of the magnetic flux leakage prevention hole 20d' in the radial direction (face corresponding to a base of a triangle) faces the adhesive injection grooves 20g and 20g which protrude from the respective permanent magnet insertion holes 20b and 20b neighboring each other in the circumferential direction, via a small gap in the radial direction. Thereby, it is possible to narrow a leakage flux path to the inner circumferential side. Further, it is possible to make the leakage flux path longer than that in the above described embodiment by a length for diverting the adhesive injection groove 20g which protrudes in the circumferential direction, and therefore it is possible to further improve the effect of reducing the leakage magnetic flux to the inner circumferential side.

Further, in the present variation example, by providing the adhesive injection groove 20g inside the magnetic flux leakage prevention hole 20d' in the radial direction, it is possible to secure an adhesive injection path while preventing the reduction of the flux which contributes to the rotational torque generation. In particular, in the present variation example, the magnetic flux leakage prevention hole 20d' is configured to have an approximately triangular shape. Thereby, it is possible to guide the magnetic flux from each of the permanent magnets 21 and 21 neighboring each other in the circumferential direction, smoothly to the outer circumferential side of the rotor iron core 20 along the two sides in the transverse cross-sectional shape of the triangle, while minimizing the reduction of the flux which contributes to the rotational torque generation.

Further, in the present variation example, the adhesive is injected into the permanent magnet insertion hole 20b in which the permanent magnet 21 is inserted, via the two adhesive injection grooves 20g and 20g which protrude to both sides of the permanent magnet insertion hole 20b in the circumferential direction. In this case, these two adhesive injection grooves 20g are communicated with each other via a small gap between each of the adhesive injection grooves 20g and the inside face of the permanent magnet 21 in the radial direction. Thereby, it is possible not only to cause the adhesive to enter the side faces of the permanent magnet 21 on both sides in the circumference direction but also to go around behind the inside face thereof in the radial direction. As a result, a bonding area can be increased and thereby it is possible to fix the permanent magnet 21 firmly to the permanent magnet insertion hole 20b.

Figure 7:
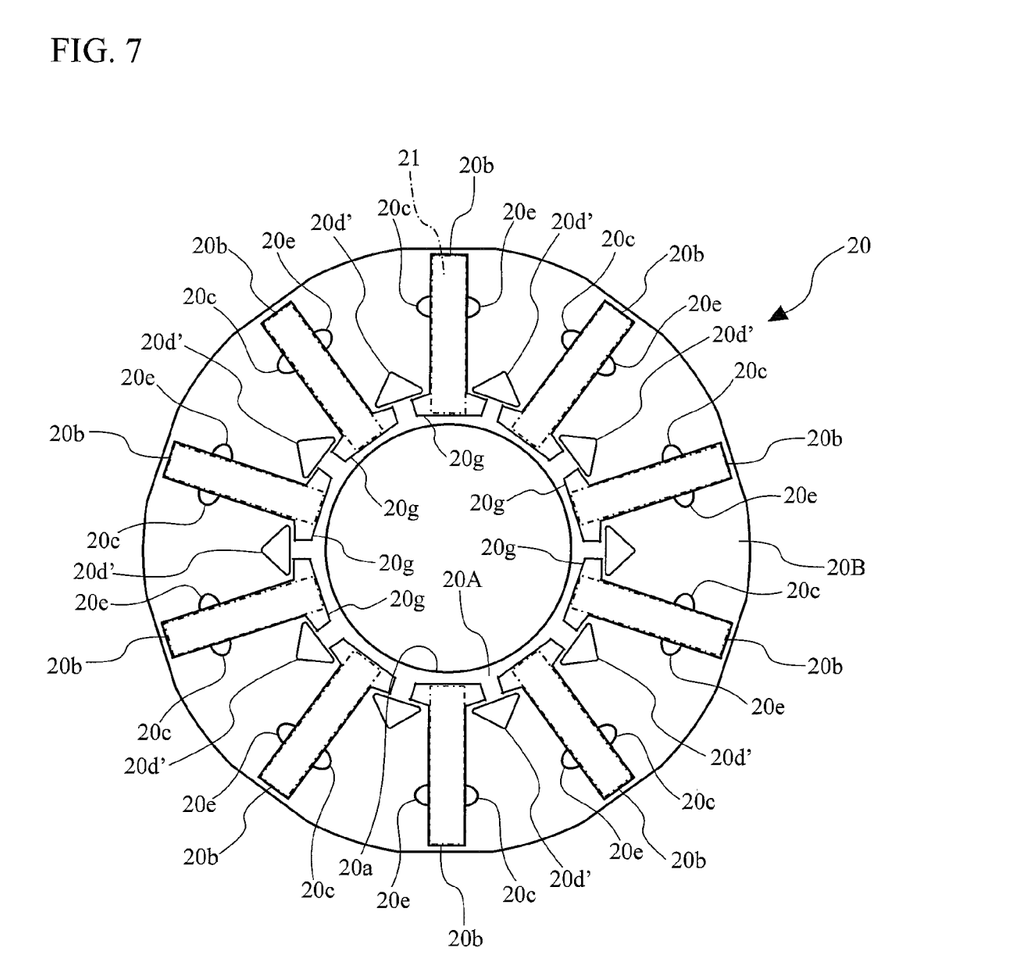
FIG. 7 is a side view showing another variation example of a rotor iron core in which an adhesive injection groove is formed inside a magnetic flux leakage prevention hole in a radial direction.

Note that another adhesive injection hole may be further provided outside the magnetic flux leakage prevention hole 20d' in the radial direction together with the adhesive injection groove 20g inside the magnetic flux leakage prevention hole 20d' in the radial direction. For example, as shown in FIG. 7, adhesive injection grooves 20c and 20e may be provided outside the magnetic flux leakage prevention hole 20d' in the radial direction so as to face each other on both sides of the permanent magnet insertion hole 20b in the circumferential direction, and also the adhesive injection groove 20g may be provided inside the magnetic flux leakage prevention hole 20d' in the radial direction. In this case, it is possible to fix the permanent magnet 21 further firmly to the permanent magnet insertion hole 20b.

(3) Others

While, in the above, a case of the inner-rotor type, in which the rotating electrical machine 1 includes the rotor 3 inside the stator 2, has been explained as an example, the embodiments are not limited to this case. That is, the disclosed embodiments can be applied to a rotating electrical machine of an outer-rotor type in which the rotor 3 is provided outside the stator 2. Further, the disclosed embodiments can be applied to a case in which the rotating electrical machine 1 is a generator instead of a motor.

Further, other than the above description, the methods of the above embodiments may be combined as appropriate for utilization.

For the others, although each example is not illustrated, the above embodiments are carried out after various modifications have been provided in the range without departing from the gist thereof.

What is claimed is:

1. A rotating electrical machine comprising:
   a stator; and
   a rotor including a rotor iron core in which a plurality of permanent magnets are disposed;
   the rotor iron core comprises:
      a connection part configured to surround a rotational axis;
      a plurality of magnetic pole parts provided farther outward than the connection part in a radial direction;
      a plurality of first gaps configured to penetrate along an axial direction between the magnetic pole parts farther outward than the connection part in the radial direction, wherein in the first gap the permanent magnet is fixed with adhesive;
      a plurality of second gaps for injection of the adhesive, at least two of the second gaps being provided for each of the first gaps in communication with the first gap; and
      a plurality of third gaps for magnetic flux leakage prevention, provided between the first gaps farther inward than the magnetic pole part in the radial direction, wherein:
   the second gaps are provided farther inward than the third gaps in the radial direction, and each of the second gaps is positioned in at least one side of the permanent magnet in a circumferential direction, the magnet being inserted in the first gap, wherein two of the second gaps are provided so as to protrude respectively towards one side and an other side in the circumferential direction for each of the first gaps,
   a transverse cross-sectional shape of the third gap is an approximately triangular shape,
   a part in the one side among a face of the third gap corresponding to a base of the triangular shape faces the second gap via an approximately linear connection portion of the rotor core in the radial direction, the second gap protruding towards the other side from the first gap in the one side among two of the first gaps being adjacent in the circumferential direction, and
   a part in the other side among the face of the third gap corresponding to the base of the triangular shape faces the second gap via an approximately linear connection portion of the rotor core in the radial direction, the second gap protruding towards the one side from the first gap in the other side among two of the first gaps being adjacent in the circumferential direction.

2. The rotating electrical machine according to claim 1, wherein:
   each of the second gaps overlap along the radial direction with the at least one side of the permanent magnet inserted in the first gap.

3. The rotating electrical machine according to claim 1, wherein:
   each of the second gaps extend along and in direct communication with the at least one side of the permanent magnet in the radial direction.

4. The rotating electrical machine according to claim 1, wherein:
   each of the second gaps extend from an inner end of the permanent magnet along the at least one side of the permanent magnet in the radial direction.

5. A rotating electrical machine comprising:
   a stator; and
   a rotor including a rotor core in which a plurality of permanent magnets are disposed;
   the rotor core comprises:
      a connection part configured to surround a rotational axis;
      a plurality of magnetic pole parts provided farther outward than the connection part in a radial direction;
      a plurality of first gaps configured to penetrate along an axial direction between the magnetic pole parts farther outward than the connection part in the radial direction, wherein in the first gap the permanent magnet is fixed with adhesive;
      a plurality of second gaps for injection of the adhesive, at least two of the second gaps being provided for each of the first gaps in communication with the first gap; and
      a plurality of third gaps for magnetic flux leakage prevention, provided between the first gaps farther inward than the magnetic pole part in the radial direction, wherein:
   the second gaps are provided farther inward than the third gaps in the radial direction,
   the at least two second gaps protruding in opposite directions from respective first gaps along a circumferential direction of the rotor core,
   a transverse cross-sectional shape of the third gap is an approximately triangular shape having a base with corner portions protruding in opposite directions along the circumferential direction of the rotor core, and
   the corner portions of the base of the third gap each respectively facing second gaps of the at least two second gaps of adjacent first gaps of the plurality of first gaps via approximately linear connection portions of the rotor core in the radial direction.

* * * * *